United States Patent [19]

Kobayashi et al.

[11] Patent Number: 4,532,280

[45] Date of Patent: Jul. 30, 1985

[54] CRYSTALLINE POLYOLEFIN-TYPE RESIN COMPOSITIONS

[75] Inventors: Toshiaki Kobayashi, Nara; Masafumi Yoshimura, Kyoto, both of Japan

[73] Assignee: New Japan Chemical Co., Ltd., Kyoto, Japan

[21] Appl. No.: 619,460

[22] Filed: Jun. 11, 1984

[51] Int. Cl.$^3$ .............................................. C08K 5/15
[52] U.S. Cl. .................................... 524/108; 524/109
[58] Field of Search ................................ 524/109, 108

[56] References Cited

U.S. PATENT DOCUMENTS

| | | | |
|---|---|---|---|
| 4,016,118 | 4/1977 | Hamada et al. | 524/108 |
| 4,314,039 | 2/1982 | Kawai et al. | 524/108 |
| 4,371,645 | 2/1983 | Mahaffey, Jr. | 524/108 |
| 4,410,649 | 10/1983 | Cieloszyk | 524/108 |
| 4,439,567 | 3/1984 | Inoue et al. | 524/108 |

FOREIGN PATENT DOCUMENTS

| | | | |
|---|---|---|---|
| 0092940 | 11/1983 | European Pat. Off. | 524/108 |
| 49-16107 | 4/1974 | Japan | 524/108 |
| 56-30450 | 3/1981 | Japan | 524/108 |
| 58-104933 | 6/1983 | Japan | 524/108 |

*Primary Examiner*—Joseph L. Schofer
*Assistant Examiner*—N. Sarofim
*Attorney, Agent, or Firm*—Armstrong, Nikaido, Marmelstein & Kubovcik

[57] ABSTRACT

This invention provides a crystalline polyolefin-type resin composition comprising a crystalline polyolefin-type resin and two kinds of nucleating agents, i.e., a di(p-substituted-benzylidene)sorbitol (I) and an o-substituted benzylidene-p-substituted benzylidene sorbitol (II) which are used in an amount of about 0.08 to about 1 part by weight per 100 parts by weight of the resin, and the proportion of (II) to (I) is about 0.5 to about 8 parts by weight of (II) per 100 parts by weight of (I). The composition can give molded articles having high transparency and other properties and free from bleeding-out.

5 Claims, No Drawings

CRYSTALLINE POLYOLEFIN-TYPE RESIN COMPOSITIONS

This invention relates to crystalline polyolefin-type resin compositions and more particularly to crystalline polyolefin-type resin compositions containing a nucleating agent which serves to improve the transparency, moldability and other properties of the resin.

Representative examples of crystalline polyolefin-type resins are low density polyethylene (LDPE), medium density polyethylene (MDPE), high density polyethylene (HDPE), linear low density polyethylene (LLDPE) to which attention has been directed in recent years, and like polyethylene resins and polypropylene resins, etc.

With their peculiar properties, these resins are widely used as the materials for producing molded articles by injection molding, blow molding, sheet molding, extrusion molding, film molding or the like. Generally in molding resins, a nucleating agent is mixed with the resin to improve the properties, its moldability and storage stability fo the resin. It is particularly known to use di(methylbenzylidene)sorbitol, di(ethylbenzylidene)sorbitol or the like as the nucleating agent in order to produce molded articles having increased transparency, gloss, dimensional stability and rigidity and other improved properties, or to enhance the molding cycle due to the increase of crystallization rate and also to prevent caving on the surface of the molded article (Japanese Examined Patent Publication No. 12460/1980 and Japanese Unexamined Patent Publication No. 30449/1981).

However, even when the conventional nucleating agent is used, the transparency and other characteristics of the resulting molded articles are not fully satisfactory. Further its use entails the problem that the nucleating agent bleeds out over the surface of the molded article (this phenomenon will be hereinafter referred to as "bleeding-out").

It is an object of the present invention to provide crystalline polyolefin-type resin compositions suitable for producing molded articles having an improved transparency.

It is another object of the invention to provide crystalline polyolefin-type resin compositions suitable for producing molded articles free from bleeding-out.

These objects and other features of the present invention will become apparent from the following description.

The present invention provides a crystalline polyolefin-type resin composition comprising a crystalline polyolefin-type resin, a di(p-substituted benzylidene)sorbitol represented by the formula

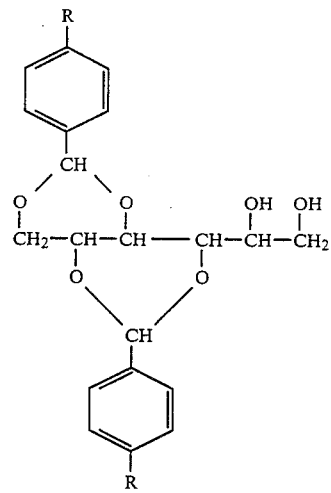

wherein R represents a methyl or ethyl group, and an o-substituted benzylidene-p-substituted benzylidene sorbitol represented by the formula

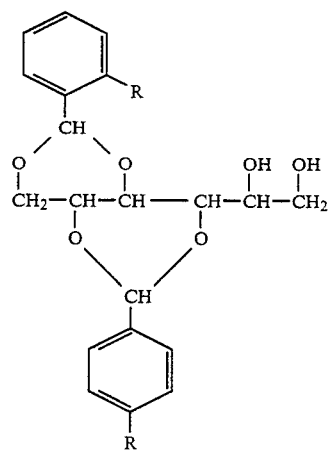

wherein R is as defined above, the total amount of the compounds of the formulae (I) and (II) being about 0.08 to about 1 part by weight per 100 parts by weight of the crystalline polyolefin-type resin, and the proportions of the compounds of the formulae (I) and (II) being about 0.5 to about 8 parts by weight of the compound of the formula (II) per 100 parts by weight of the compound of the formula (I).

We conducted extensive research to overcome the foregoing drawbacks of the conventional nucleating agents and found the following. Conventionally, it has not been specifically clarified how the properties of the above known nucleating agent, di(methylbenzylidene)-sorbitol or di(ethylbenzylidene)sorbitol, are related to the substitution of methyl or ethyl group of the nucleating agent in ortho, meta or para position, and it has been believed that the properties of the nucleating agents scarcely vary with the position in which the methyl or ethyl group is substituted.

Our research, however, demonstrated that the properties of the nucleating agents greatly vary with the position in which the methyl or ethyl group is substituted. Generally, di(p-substituted benzylidene)sorbitol (hereinafter simply referred to as "-substituted derivative") tends to exhibit significantly improved properties as a nucleating agent, and di(m-substituted benzylidene)sorbitol (hereinafter simply referred to as "m-substituted derivative") and di(o-substituted benzylidene)sorbitol (hereinafter simply referred to as "o-substituted derivative") have unsatisfactory properties. Although the p-substituted derivative as singly used is able to produce a certain level of results, the results are not always considered fully satisfactory. To solve this problem, we continued the research, and discovered that the use of p-substituted derivative in combination with o-substituted benzylidene-p-substituted benzylidene sorbitol (hereinafter simply referred to as "o,p-substituted derivative") in a specific ratio can give remarkable results, compared with p-substituted derivative as singly used or o,p-substituted derivative as singly used. Based on this novel finding, the present invention has been accomplished.

According to the present invention, the following outstanding results can be achieved.

(a) Molded articles having a markedly high transparency can be produced.

(b) Molded articles free from bleeding-out can be produced.

(c) The present composition can be fed at a higher rate in molding operation for producing resin pellets.

(d) Molded articles having a high gloss and improved rigidity can be produced.

(e) Molding operation can be conducted at a higher rate due to the increase of crystallization rate.

(f) Oriented polypropylene film can be formed with improved dimensional stability.

(g) Molded articles can be produced by injection molding with increased dimensional stability and without caving on the surface of the article.

These results can not be produced by conjoint use of the p-substituted derivative and the m-substituted benzylidene-p-substituted benzylidene sorbitol (hereinafter simply referred to as "m,p-substituted derivative") or by combined use of the p-substituted derivative and the m-substituted benzylidene-o-substituted benzylidene sorbitol (hereinafter simply referred to as "m,o-substituted derivative"). Nor can the excellent results can be attained by conjoint use of o,p-substituted derivative and m-substituted derivative or o-substituted derivative.

We are the first to discover that these remarkable results can be produced only by the combined use of p-substituted derivative and o,p-substituted derivative.

The proportions of the compounds of the formulae (I) and (II) are important in the present invention. The desired results can be usually achieved by use of the o,p-substituted derivative of the formula (II) in an amount of about 0.5 to about 8 parts by weight, preferably about 1 to about 5 parts by weight, per 100 parts by weight of the p-substituted derivative of the formula (I). If the derivative (II) is used in an amount of less than 0.5 part or more than 8 parts by weight, the results as contemplated are produced to lesser extent. The derivatives of the formulas (I) and (II) can be added to the resin separately or in admixture. The total amount of the derivatives (I) and (II) to be added is usually about 0.08 to about 1 part by weight, preferably about 0.1 to about 0.5 part by weight, per 100 parts by weight of the crystalline polyolefin-type resin. The composition comprising these components in such ratio is usable as it is for molding articles, and can produce the results as contemplated. According to the present invention, the nucleating agants can be added directly to the resin or added in the form of a master batch having a high concentration of about 4 to about 15%. The p-substituted derivatives of the formula (I) are known compounds. The o,p-substituted derivative of the formula (II) can be prepared, for example, by adding a hydrochloric acid catalyst (3%) to an equimolar mixture of a 50% aqueous solution of sorbitol and p-methylbenzaldehyde, stirring the mixture at 30° C. for about 3 hours, neutralizing the deposited compound, recrystallizing the solid from a water/methanol mixture to give 2,4-p-methylbenzylidene sorbitol in a yield of about 50%, then adding an equimolar amount of o-methylbenzaldehyde to the 2,4-p-methylbenzylidene sorbitol, adding a hydrochloric acid catalyst (3%) to the mixture in the presence of methanol, and stirring the resulting mixture at 30° C. for about 3 hours, giving o-methylbenzylidene-p-methylbenzylidene sorbitol of the formula (II) as contemplated, in a yield of about 80%. The o-ethylbenzylidene-p-ethylbenzylidene sorbitol can be produced by the same process as above using ethyl-substituted starting materials.

Crystalline polyolefin-type resins useful in the present invention include a wide range of those, such as ethylene homopolymer (high density, medium density or low density polyethylene), ethylene copolymer containing at least 50% of ethylene, propylene homopolymer, propylene copolymer containing at least 50% of propylene and like crystalline ethylene-type and propylene-type resins. The copolymers may be either random copolymers or block copolymers. The comonomers forming the copolymers are various and include ethylene, propylene, butene, pentene, hexene, olefin having 7 to 18 carbon atoms, etc. Illustrative of useful comonomers are vinyl acetate, ethylene, propylene, butene, pentene, hexene, heptene, octene, nonene, decene, undecene, dodecene and like $\alpha$-olefins having 2 to 18 carbon atoms, methyl acrylate, ethyl acrylate, 2-ethylhexyl acrylate and like alkyl acrylates, methyl methacrylate, ethyl methacrylate, 2-ethylhexyl methacrylate and like alkyl methacrylates, etc. Useful alkyls forming the alkyl acrylates or methacrylates are those having 1 to 18 carbon atoms. Furthermore, polyisobutylene, polybutene, terpene phenol resin or like suitable polymer can be used conjointly with the resin exemplified above.

The composition of the present invention may further contain a metal salt of carboxylic acid which serves to provide a molded article with even more improved transparency. Useful metal salts of carboxylic acids include a wide range of those heretofore know. Suitable carboxylic acids can be any of monocarboxylic acids or polycarboxylic acids having 3 to 40 carbon atoms. Examples of useful metal salts are salts of potassium, sodium, lithium, calcium, magnesium, aluminium, barium, tin, zinc and like metals. Examples of useful carboxylic acid metal salts include higher fatty acid soap, rhodinic acid soap, benzoic acid soap, naphthenic acid soap, lactic acid salt, citric acid salt, succinic acid salt, 12-hydroxystearic acid soap, dihydroxystearic acid soap, gluconic acid salt, sorbic acid salt, salicylic acid salt, di-n-octyl tin lauric acid salt, malic acid salt, dimer acid salt, trimellitic acid salt, phthalic acid salt, tetrahydrophthalic acid salt, hexahydrophthalic acid salt, etc. The amount of carboxylic acid metal salt is suitably determined over a wide range and is usually about 0.01 to about 0.5 part by weight, preferably about 0.05 to about 0.3 part by weight, per 100 parts by weight of the resin. Carboxylic acid metal salt is usually added when the resin is mixed with the nucleating agents.

Additives commonly used in the art can also be incorporated in the present composition according to its specific application or a purpose of use. Suitable additives include antioxidant, thermostabilizer, ultraviolet absorber, lubricant, cross-linking agent, cross-linking promoter, foaming agent, coloring agent, dispersant, filler, antistatic agent, dyestuff, pigment, etc.

The present composition can be prepared by any of suitable processes heretofore known. For example, the present composition is produced by blending the crystalline polyolefin-type resin and the nucleating agents of the formulae (I) and (II) and, when required, carboxylic acid metal salt and like additives, or by melting a mixture of the resin, and nucleating agents and, if necessary, additives, and cooling the melt into pellets. The composition thus obtained is molded into the desired product.

Any of conventional molding methods can be employed to mold the present composition prepared above. Representative molding methods are those of injection molding, sheet and press molding, extrusion molding, inflation molding, blow molding, etc.

The present invention will be described below in more detail with reference to the following Examples and Comparison Examples in which the measurement of haze value of the sheets and the observation of sheets for the presence or absence of bleeding-out were conducted after the sheets had been left to stand in a constant-temperature chamber having a temperature of 25° C. and a humidity of 60% for 6 months. The haze vaue of the sheets was determined according to ASTM D-1003 and the sheets were observed with unaided eye to check for the occurrence of bleeding-out.

EXAMPLE 1

Nucleating agents in each combination as shown below in Table 1 in an amount as specified therein were mixed with 100 parts by weight of random polypropylene (propylene-ethylene random copolymer containing 4% by weight of ethylene and having a melt index of 7) for injection molding. The mixture was preheated at 230° C. for 2 minutes and kneaded for 3 minutes by Labo- Plast Mill (two-rotor type) at 60 rpm. Then the resulting mixture was preheated at 200° C. for 7 minutes and pressed for 3 minutes with water cooling under a pressure of 150 kg/cm$^2$ to form a sheet 1 mm in thickness. Table 1 below shows the haze value of the sheets and the presence or absence of bleeding-out. The words "slight bleeding-out" used in Table 1 and the other tables given later mean bleeding-out occurred to a slight degree in which the haze value of the sheet increased by about 3 to about 7% when the sheet had been allowed to stand in a constant-temperature chamber at 25° C. for 6 months. An abbreviation "PHR" used in Table 1 and the other tables stands for part by weight per one hundred parts by weight of the resin, and the ratios in Table 1 and other tables are all by weight.

COMPARISON EXAMPLE 1

Sheets were produced in the same manner as in Example 1 with the exception of using the nucleating agents as shown in Table 1 in an amount as listed therein. The haze value of the sheets thus formed was measured, and the sheets were observed for the occurrence of bleeding-out, with the results indicated below in Table 1.

TABLE 1

| No. | Nucleating agent Kind | Ratio | Amount (PHR) | Carboxylic acid metal salt (with amount in PHR) | Haze value (%) | Bleeding-out |
|---|---|---|---|---|---|---|
| Example 1 | | | | | | |
| 1. | p-MeDBS<br>o, p-MeDBS | 100<br>5 | 0.3 | — | 9 | None |
| 2. | p-MeDBS<br>o, p-MeDBS | 100<br>5 | 0.3 | Calcium stearate (0.10) | 7 | None |
| 3. | p-MeDBS<br>o, p-MeDBS | 100<br>8 | 0.25 | Lithium hydroxystearate (0.10) | 8 | None |
| Comp. Example 1 | | | | | | |
| 1. | — | — | — | — | 72 | None |
| 2. | — | — | — | Calcium stearate (0.15) | 72 | None |
| 3. | DBS | — | 0.3 | — | 24 | None |
| 4. | o-MeDBS | — | 0.3 | — | 19 | Slight bleeding-out |
| 5. | m-MeDBS | — | 0.3 | — | 19 | Slight bleeding-out |
| 6. | p-MeDBS | — | 0.3 | — | 12 | Slight bleeding-out |
| 7. | p-MeDBS<br>m, p-MeDBS | 100<br>5 | 0.3 | — | 14 | Slight bleeding-out |
| 8. | p-MeDBS<br>m, o-MeDBS | 100<br>5 | 0.3 | — | 14 | Slight bleeding-out |
| 9. | o-MeDBS<br>o, p-MeDBS | 100<br>5 | 0.3 | — | 19 | Slight bleeding-out |
| 10. | m-MeDBS<br>o, p-MeDBS | 100<br>5 | 0.3 | — | 19 | Slight bleeding-out |
| 11. | o, p-MeDBS | — | 0.3 | — | 15 | Slight bleeding-out |

The abbreviations in Table 1 stand for the following.
DBS ... Dibenzylidene sorbitol
o-MeDBS ... Di-(o-methylbenzylidene)sorbitol
m-MeDBS ... Di-(m-methylbenzylidene)sorbitol
p-MeDBS ... Di-(p-methylbenzylidene)sorbitol
o, p-MeDBS ... o-Methylbenzylidene-p-methylbenzylidene sorbitol
m, o-MeDBS ... m-Methylbenzylidene-o-methylbenzylidene sorbitol
m, p-MeDBS ... m-Methylbenzylidene-p-methylbenzylidene sorbitol These abbreviations will be used hereinafter to express the same meanings as above. An abbreviation "Et" appearing hereinafter in place of Me denotes an ethyl-substituted derivative and is used in the same manner as Me.

Table 1 demonstrates that the sheets produced according to the present invention exhibit a significantly high transparency and are free from bleeding-out. As seen from Example 1, No. 1 and Comparison Example 1, Nos. 4 to 6, the conjoint use of p-substituted derivative and o,p-substituted derivative according to the present invention leads to production of sheets with a higher transparency than when using singly o-substituted derivative, m-substituted derivative or p-substituted derivative. As seen from Comparison Example 1, Nos. 7 and 8, the use of p-substituted derivative in combination with m,p-substituted derivative or with m,o-substituted derivative can not achieve results commensurate with those attainable in the present invention. Further it is clear from Comparison Example 1, Nos. 9 and 10 that even the use of o,p-substituted derivative in combination with o-substituted derivative or with m-substituted derivatives can not produce the results as contemplated in the present invention. Also Comparison Example 1, No. 11 indicates that the results given in the present invention can not be obtained by the use of o,p-substituted derivative alone.

The difference in haze values of 9 and 12 between the sheets produced in Example 1, No. 1 and Comparison Example, No. 6, respectively is of great significance for the following reasons. For example, when producing molded articles of the same transparency, the composition as used in Example 1, No. 1 can be moded into an article which is 33% thicker than the composition in Comparison Example 1, No. 6, thus giving satisfactory mechanical strength to the article without reducing the transparency. Reversely, when producing molded articles with the same thickness, the former composition gives molded articles with such transparency that the body within the article is 33% more clearly visible than in the article from the latter composition. With these excellent properties, the former composition can be advantageously used with remarkable results in manufacture of molded products required to have a high transparency such as disposable syringes and like medical instruments, their joints, food packages, tableware, machine parts, box-like cover for meters or like instruments, etc.

EXAMPLE 2

Sheets were produced in the same manner as in Example 1 with the exception of using o,p-substituted derivative in various amounts as shown below in Table 2 per 100 parts by weight of p-substituted derivative and employing the nucleating agents in an amount of 0.4 part by weight per 100 parts by weight of the resin.

Table 2 also demonstrates the haze value of the sheets and the presence or absence of bleeding-out.

TABLE 2

| No. | Proportions of nucleating agents (weight ratio) p-MeDBS | o, p-MeDBS | Haze value (%) | Bleeding-out |
|---|---|---|---|---|
| 1. | 100 | 0.5 | 9 | None |
| 2. | 100 | 2 | 8 | None |
| 3. | 100 | 4 | 8 | None |
| 4. | 100 | 6 | 9 | None |
| 5. | 100 | 8 | 10 | None |
| Control 1 | 100 | 0.3 | 12 | Slight bleeding-out |
| Control 2 | 100 | 10 | 15 | Slight bleeding-out |

EXAMPLE 3

The same procedure as in Example 1 was repeated to produce sheets with the exception of using the nucleating agents as shown below in Table 3. Table 3 also indicates the haze value of the sheets thus produced and the presence or absence of bleeding-out.

COMPARISON EXAMPLE 2

Sheets were produced in the same manner as in Example 1 with the exception of using the nucleating agents as shown in Table 3, which also lists the haze value of the sheets and the presence or absence of bleeding-out.

TABLE 3

| No. | Nucleating agent Kind | Ratio | Amount (PHR) | Carboxylic acid metal salt (with amount in PHR) | Haze value (%) | Bleeding-out |
|---|---|---|---|---|---|---|
| Example 3 | | | | | | |
| 1. | p-EtDBS<br>o, p-EtDBS | 100<br>0.6 | 0.4 | — | 12 | None |
| 2. | p-EtDBS<br>o, p-EtDBS | 100<br>3 | 0.4 | — | 11 | None |
| 3. | p-EtDBS<br>o, p-EtDBS | 100<br>3 | 0.4 | Lithium hydroxystearate (0.08) | 9 | None |
| Comp. Example 2 | | | | | | |
| 1. | o-EtDBS | — | 0.4 | — | 24 | None |
| 2. | m-EtDBS | — | 0.4 | — | 24 | None |
| 3. | p-EtDBS | — | 0.4 | — | 17 | Slight bleeding-out |
| 4. | p-EtDBS | — | 0.4 | Lithium hydroxystearate | 15 | Slight bleeding-out |

EXAMPLE 4

Sheets were produced in the same manner as in Example 1 except that a propylene homopolymer (having a melt index of 1.0) was used in place of the random polypropylene for injection molding, and that the nucleating agents as listed below in Table 4 in an amount as indicated therein. Table 4 also shows the haze value of the sheets and the presence or absence of bleeding-out.

COMPARISON EXAMPLE 3

The procedure of Example 4 was repeated to give sheets with the exception of using the nucleating agents as shown below in Table 4, which also indicates the haze value of the sheets and the presence or absence of bleeding-out.

TABLE 4

| No. | Nucleating agent Kind | Ratio | Amount (PHR) | Carboxylic acid metal salt (with amount in PHR) | Haze value (%) | Bleeding-out |
|---|---|---|---|---|---|---|
| Example 4 | | | | | | |
| 1. | p-MeDBS | 100 | 0.1 | Sodium stearate (0.2) | 18 | None |
|  | o, p-MeDBS | 4 | | | | |
| 2. | p-MeDBS | 100 | 0.2 | Sodium stearate (0.2) | 14 | None |
|  | o, p-MeDBS | 4 | | | | |
| 3. | p-MeDBS | 100 | 0.3 | Sodium stearate (0.2) | 13 | None |
|  | o, p-MeDBS | 4 | | | | |
| 4. | p-MeDBS | 100 | 0.1 | — | 20 | None |
|  | o, p-MeDBS | 4 | | | | |
| 5. | p-MeDBS | 100 | 0.2 | — | 19 | None |
|  | o, p-MeDBS | 4 | | | | |
| 6. | p-MeDBS | 100 | 0.3 | — | 15 | None |
|  | o, p-MeDBS | 4 | | | | |
| 7. | p-EtDBS | 100 | 0.1 | Calcium stearate (0.1) | 25 | None |
|  | o, p-EtDBS | 2 | | | | |
| 8. | p-EtDBS | 100 | 0.2 | Calcium stearate (0.1) | 17 | None |
|  | o, p-EtDBS | 2 | | | | |
| 9. | p-EtDBS | 100 | 0.3 | Calcium stearate (0.1) | 15 | None |
|  | o, p-EtDBS | 2 | | | | |
| 10. | p-EtDBS | 100 | 0.1 | — | 27 | None |
|  | o, p-EtDBS | 2 | | | | |
| 11. | p-EtDBS | 100 | 0.2 | — | 20 | None |
|  | o, p-EtDBS | 2 | | | | |
| 12. | p-EtDBS | 100 | 0.3 | — | 17 | None |
|  | o, p-EtDBS | 2 | | | | |
| Comp. Example 3 | | | | | | |
| 1. | m-MeDBS | — | 0.2 | — | 37 | Slight bleeding-out |
| 2. | o-MeDBS | — | 0.2 | — | 37 | Slight bleeding-out |
| 3. | p-MeDBS | — | 0.2 | — | 20 | Slight bleeding-out |
| 4. | m-EtDBS | — | 0.2 | — | 39 | Slight bleeding-out |
| 5. | o-EtDBS | — | 0.2 | — | 38 | Slight bleeding-out |
| 6. | p-EtDBS | — | 0.2 | — | 23 | Slight bleeding-out |
| 7. | DBS | — | 0.2 | Calcium stearate (0.1) | 30 | Slight bleeding-out |
| 8. | DBS | — | 0.2 | — | 35 | Slight bleeding-out |

EXAMPLE 5

The procedure of Example 1 was repeated to produce sheets with the exception of using linear low density polyethylene (trademark "Ultzex", product of Mitsui Petrochemical Industries, Ltd.) as a crystalline polyolefin-type resin and the nucleating agents as shown below in Table 5, which also lists the haze value of the sheets and the presence or absence of bleeding-out.

COMPARISON EXAMPLE 4

Sheets were made by the same process as in Example 5 with the exception of using the nucleating agents as listed below in Table 5 which also indicates the haze value of the sheets and the presence or absence of bleeding-out.

TABLE 5

| No. | Nucleating agent Kind | Ratio | Amount (PHR) | Carboxylic acid metal salt (with amount in PHR) | Haze value (%) |
|---|---|---|---|---|---|
| Example 5 | | | | | |
| 1. | p-MeDBS | 100 | 0.1 | — | 15 |
|  | o, p-MeDBS | 3 | | | |
| 2. | p-MeDBS | 100 | 0.1 | Calcium stearate (0.05) | 14 |
|  | o, p-MeDBS | 3 | | | |
| 3. | p-MeDBS | 100 | 0.2 | Calcium stearate (0.05) | 12 |
|  | o, p-MeDBS | 3 | | | |
| 4. | p-EtDBS | 100 | 0.1 | — | 16 |
|  | o, p-EtDBS | 3 | | | |
| 5. | p-EtDBS | 100 | 0.2 | Calcium stearate (0.05) | 14 |
|  | o, p-EtDBS | 3 | | | |
| Comp. Example 4 | | | | | |
| 1. | — | — | — | — | 73 |
| 2. | p-MeDBS | — | 0.1 | — | 18 |
| 3. | m-MeDBS | — | 0.1 | — | 25 |
| 4. | o-MeDBS | — | 0.1 | — | 23 |
| 5. | p-EtDBS | — | 0.1 | — | 20 |
| 6. | m-EtDBS | — | 0.1 | — | 27 |
| 7. | o-EtDBS | — | 0.1 | — | 23 |

EXAMPLE 6

Sheets were made in the same manner as in Example 1 with the exception of using low density polyethylene (trademark "Yukaron MS 30", product of Mitsubishi Petrochemical Co., Ltd.) as a crystalline polyolefin-type resin and the nucleating agents as listed below in Table 6, which also indicates the haze value of the sheets and the presence or absence of bleeding-out.

COMPARISON EXAMPLE 5

Sheets were produced in the same manner as in Example 6 with the exception of using the nucleating agents as indicated below in Table 6, which also lists the haze value of the sheets and the presence or absence of bleeding-out.

TABLE 6

| No. | Nucleating agent Kind | Ratio | Amount (PHR) | Carboxylic acid metal salt (with amount in PHR) | Haze value (%) | Bleeding-out |
|---|---|---|---|---|---|---|
| Example 6 | | | | | | |
| 1. | p-MeDBS<br>o, p-MeDBS | 100<br>1 | 0.2 | — | 9 | None |
| 2. | p-MeDBS<br>o, p-MeDBS | 100<br>1 | 0.2 | Calcium stearate (0.15) | 7 | None |
| 3. | p-MeDBS<br>o, p-MeDBS | 100<br>1 | 0.1 | Calcium stearate (0.15) | 7 | None |
| 4. | p-EtDBS<br>o, p-EtDBS | 100<br>1 | 0.2 | — | 9 | None |
| 5. | p-EtDBS<br>o, p-EtDBS | 100<br>1 | 0.2 | Calcium stearate (0.15) | 8 | None |
| 6. | p-EtDBS<br>o, p-EtDBS | 100<br>1 | 0.1 | Calcium stearate (0.15) | 8 | None |
| Comp. Example 5 | | | | | | |
| 1. | — | — | — | — | 45 | None |
| 2. | p-MeDBS | — | 0.2 | — | 13 | Slight bleeding-out |
| 3. | m-MeDBS | — | 0.2 | — | 18 | Slight bleeding-out |
| 4. | o-MeDBS | — | 0.2 | — | 19 | Slight bleeding-out |
| 5. | p-EtDBS | — | 0.2 | — | 13 | Slight bleeding-out |
| 6. | m-EtDBS | — | 0.2 | — | 21 | Slight bleeding-out |
| 7. | o-EtDBS | — | 0.2 | — | 21 | Slight bleeding-out |

The above Examples and Comparison Examples show that the use of the p-substituted derivative in combination with the o,p-substituted derivative according to the present invention results in the production of molded articles having a markedly improved transparency and free from bleeding-out.

We claim:

1. A crystalline polyolefin resin composition comprising a crystalline polyolefin resin, a di(p-substituted benzylidene)sorbitol represented by the formula

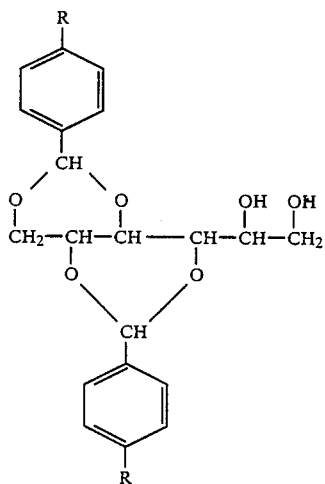

wherein R represents a methyl or ethyl group, and an o-substituted benzylidene-p-substituted benzylidene sorbitol represented by the formula

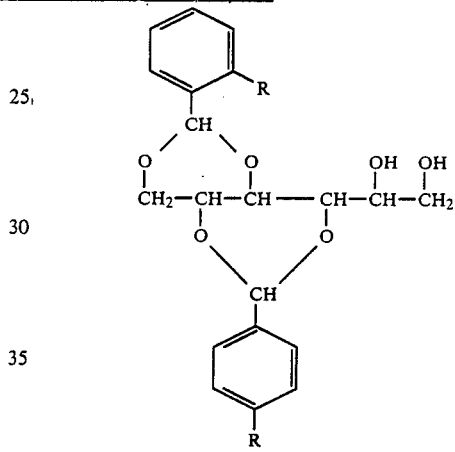

wherein R is as defined above, the total amount of the compounds of the formulae (I) and (II) being about 0.08 to about 1 part by weight per 100 parts by weight of the crystalline polyolefin resin, and the proportions of the compounds of the formulae (I) and (II) being about 0.5 to about 8 parts by weight of the compound of the formula (II) per 100 parts by weight of the compound of the formula (I).

2. A composition as defined in claim 1 in which the crystalline polyolefin resin is low density polyethylene, medium density polyethylene or high density polyethylene, ethylene copolymer containing at least 50% of ethylene, propylene homopolymer or propylene containing at least 50% of propylene.

3. A composition as defined in claim 1 which contains the di(p-substituted benzylidene)sorbitol of the formula (I) and the o-substituted benzylidene-p-substituted benzylidene sorbitol of the formula (II) in a total amount of about 0.1 to about 0.5 part by weight per 100 parts by weight of the crystalline polyolefin resin.

4. A composition as defined in claim 1 in which the o-substituted benzylidene-p-substituted benzylidene sorbitol of the formula (II) is used in an amount of about 1 to about 5 parts by weight per 100 parts by weight of the di(p-substituted benzylidene)sorbitol of the formula (I).

5. A composition as defined in claim 1 which further contains about 0.01 to about 0.5 part by weight of carboxylic acid metal salt per 100 parts by weight of the crystalline polyolefin resin.

* * * * *